(12) United States Patent
Engelhardt

(10) Patent No.: US 6,608,295 B2
(45) Date of Patent: Aug. 19, 2003

(54) METHOD AND ARRANGEMENT FOR COMPENSATING FOR IMAGING DEFECTS

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/106,533

(22) Filed: Mar. 26, 2002

(65) Prior Publication Data

US 2002/0162955 A1 Nov. 7, 2002

(30) Foreign Application Priority Data

Mar. 29, 2001 (DE) .......................... 101 15 578

(51) Int. Cl.$^7$ .............................................. G02B 27/40
(52) U.S. Cl. ................... 250/201.3; 250/208.1; 250/234; 250/235
(58) Field of Search .......................... 250/201.3, 234, 250/216, 235, 208.1; 359/368, 385–389, 362, 383, 392–393; 356/237.2–237.6; 382/141, 144–145, 149, 181; 358/494, 505

(56) References Cited

U.S. PATENT DOCUMENTS

| | | | | | |
|---|---|---|---|---|---|
| 5,612,818 | A | * | 3/1997 | Kumagai et al. | 359/385 |
| 5,936,764 | A | * | 8/1999 | Kobayashi | 359/385 |
| 6,212,292 | B1 | * | 4/2001 | Soares | 382/141 |
| 6,248,988 | B1 | * | 6/2001 | Krantz | 250/201.3 |
| 6,366,352 | B1 | * | 4/2002 | Goldberg et al. | 356/237.2 |

\* cited by examiner

Primary Examiner—David Porta
Assistant Examiner—Patrick J. Lee
(74) Attorney, Agent, or Firm—Simpson & Simpson, PLLC

(57) ABSTRACT

A scanning microscope has at least one illumination source for emitting a light beam, which is fed via a microscope optic to a specimen and scans the latter. In order to correct the imaging defect of the microscope optic, said defect is determined and a correction value is determined therefrom. This correction value is used for influencing control signals which control the impinging of the light beam on the specimen.

13 Claims, 3 Drawing Sheets

METHOD AND ARRANGEMENT FOR COMPENSATING FOR IMAGING DEFECTS

CROSS REFERENCE TO RELATED APPLICATIONS

This application claims priority of German Patent Application No. 101 15 578.6, filed Mar. 29, 2001, incorporated by reference herein.

FIELD OF THE INVENTION

The invention relates to a method for compensating for imaging defects in scanning microscopy and to a scanning microscope.

BACKGROUND OF THE INVENTION

In scanning microscopy, a specimen is illuminated by a light beam in order to observe the reflected or fluorescent light thereupon emitted by the specimen, laser beams usually being used for illumination. In this case, a specimen is scanned by means of a finely focused light beam. The focus of the illumination light beam is moved in a specimen plane with the aid of a controllable beam deflection device, which generally has two tiltable mirrors. In this case, the deflection axes are usually perpendicular to one another, so that one mirror deflects the incident beam in the x-direction and the other deflects the beam in the y-direction. The tilting of the mirrors is achieved for example with the aid of galvanometer actuating elements.

Especially in confocal scanning microscopy, a specimen is scanned with the focus of a light beam in three dimensions. A confocal scanning microscope generally comprises a light source, a focusing optic by which the light from the source is focused onto a pinhole aperture—the so-called excitation aperture—a beam splitter, a beam deflection device for beam control, a microscope optic, a detection aperture and the detectors for registering the detection or fluorescent light. The illumination light is coupled in via a beam splitter. The fluorescent or reflected light coming from the specimen travels back via the beam deflection device to the beam splitter, and passes through the latter in order subsequently to be focused onto the detection aperture, behind which the detectors, usually photomultipliers, are situated. Detection light which does not originate directly from the focus region takes a different light path and does not pass through the detection aperture, so that point information is obtained which leads to a three-dimensional image by sequential scanning of the specimen.

A three-dimensional image is usually obtained by layer-by-layer imaging. In this case, the specimen is scanned in the axial direction (z-direction) usually by so-called specimen scanning, in which the specimen is moved in the z-direction with the aid of the specimen stage. However, this can also be achieved by displacing the objective in the axial direction, which is accompanied by a displacement of the focus of the illumination beam.

The reflected or fluorescent light emitted by the specimen when illuminated travels via a beam splitter to a detector having an entry pinhole. The power of the light coming from the specimen is measured depending on the position of the scanning beam preferably at fixed time intervals. As a result, it is possible to scan the specimen raster point by raster point in three dimensions and to determine for each scanning point a measured value which is representative of this specimen point.

With the lasers that are usually used as illumination sources in scanning microscopes, the specimen can be optimally illuminated for achieving the desired result. However, image defects always accompany the imaging of the specimen by the optical components of the microscope that are involved, which image defects may be caused by aberration, for example. Said imaging defects can be classified into geometrical and chromatic imaging defects. In monochromatic microscopy, in which the specimen is illuminated by the light of a single wavelength, in order to observe the light reflected from the specimen, only the geometrical imaging defects have to be taken into account. In fluorescence microscopy or when using a polychromatic illumination source, the chromatic imaging defects must additionally be taken into account. The image defects can in part be avoided by using high-quality, corrected optical elements. However, such high-quality elements, in particular complex corrected microscope objectives, are very expensive. Moreover, such corrected optical elements usually comprise more optical sub elements than optical elements which are corrected only slightly or not at all; thus, apochromatic microscope objectives usually comprise 10 to 15 different lenses. The multiplicity of optical sub elements means that the transmissivity of the optical system, that is to say of the optic, inevitably suffers compared with elements that are not corrected or are only slightly corrected.

SUMMARY OF THE INVENTION

It is an object of the present invention, therefore, to propose a simple and cost-effective method for compensating for imaging defects.

This object is achieved by a method for compensating for imaging defects in scanning microscopy comprising the steps of:
  scanning a specimen by a light beam at raster points, which define a scanning line, whereby the light beam is guided by a scanning device through a microscope optic,
  determining an imaging defect of the microscope optic,
  determining a correction value for at least one raster point from the imaging defect,
  calculating a corrected scanning line with respect to the correction value,
  scanning the specimen at raster points defined by the corrected scanning line.

It is another object of the invention to disclose a scanning microscope with improved image quality.

This object is achieved by a scanning microscope comprising:
  a light source for emitting a light beam,
  a microscope optic for focusing the light beam onto a specimen,
  a scanning device for scanning the specimen by the light beam at raster points, which define a scanning line,
  means for determining the imaging defect of the microscope optic,
  means for determining correction values for at least one raster point,
  means for calculating a corrected scanning line from the correction values.

The invention has recognized that imaging defects are compensated for by suitably influencing the control of the impinging of the scanning radiation on the specimen. In particular, a beam deflection device provided for influencing the point at which the scanning radiation impinges can be influenced in accordance with the correction values determined. In the case of specimen scanning, however, it is also possible for the control of the position of the specimen stage on which the specimen to be examined is applied to be influenced in this way. As an alternative or in addition to this, it is also possible to influence the scanning speed in accordance with the correction values. This means that the imaging defects that are always inherently present in optical systems or optics can already be compensated for during the image recording. In this case, the correction value determined can be used in such a way that the scanning speed and/or the scanning path are influenced in such a way that the imaging defects of the optics are compensated for.

In order to determine the imaging defect, preferably the optic used is firstly measured. For this purpose, it is possible for a specimen that is known sufficiently precisely to be scanned in a reference measurement. In a further method step, the image of the specimen is measured and examined for image defects. A special algorithm, which can be realized e.g. in the form of an image processing program, can then determine a correction value for each raster point. By way of example, for this purpose, reference image data can be compared with the image data actually determined and a correction value can thus be determined for each raster point. This correction value thus determined is converted into a control correction signal in a further step and then taken into account in the scanning of a specimen.

As described, the correction value can be determined either in one step or iteratively. An iterative procedure may also be based on beginning with randomly determined correction values in order gradually to bring about an optimization in further iteration steps. A genetic algorithm is preferably used for this.

A scanning microscope according to the invention, which has a scanning beam which is directed via an optic onto a specimen in order to scan the latter, has means for determining the imagining defects of the optic used, means for determining correction values for at least one raster point and means for influencing the impinging of the scanning beam on the specimen.

In this case, a computer with image processing software is preferably used for determining the imaging defect of the optic. The correction values which have been determined in accordance with the specified method are advantageously stored in a memory for all the objectives used, in particular for the objectives kept in an objective turret. The correction values are transferred to the control unit, in which they are converted into control signals which drive the beam deflection device. In a concrete embodiment, e.g. the current driving the galvanometer can be correspondingly controlled by the correction values.

However, the correction values can also be transferred to a control unit in which they are converted into control signals for the specimen stage control and are used for controlling the movement of the specimen stage and thus indirectly for controlling the position of the focus in the specimen. In this case, by way of example, in order to compensate for the image field curvature, the focus of the illuminating light beam is displaced in the axial direction relative to the specimen during the image recording. For this purpose, use may be made either of a driven specimen stage or of an objective which can be displaced by a motor, in which case the driving motor, which may be e.g. an electric motor, a stepper motor or an ultrasonic motor, is addressed with the corresponding control correction signals.

In the case of sequential illumination with light of varying wavelength, a longitudinal chromatic aberration of the scanning microscope optic can be compensated for by suitable driving of the axial displacement apparatus of the focus. Analogously, suitable beam deflection device control according to the invention enables a chromatic difference of magnification to be compensated for.

Since principally geometrical imaging defects can be corrected with the aid of the method according to the invention, the scanning microscope according to the invention preferably comprises optical elements which have largely been chromatically corrected in the known manner, in which case the compensation can be performed according to the invention essentially without adversely affecting the costs of the optical imaging device.

BRIEF DESCRIPTION OF THE DRAWINGS

Further advantages and advantageous embodiments of the invention emerge from the figures below and the description thereof; in the illustration of the figures, a representation true to scale has been dispensed with in favor of clarity. Specifically, in the figures.

DETAILED DESCRIPTION OF THE INVENTION

Figure 1:
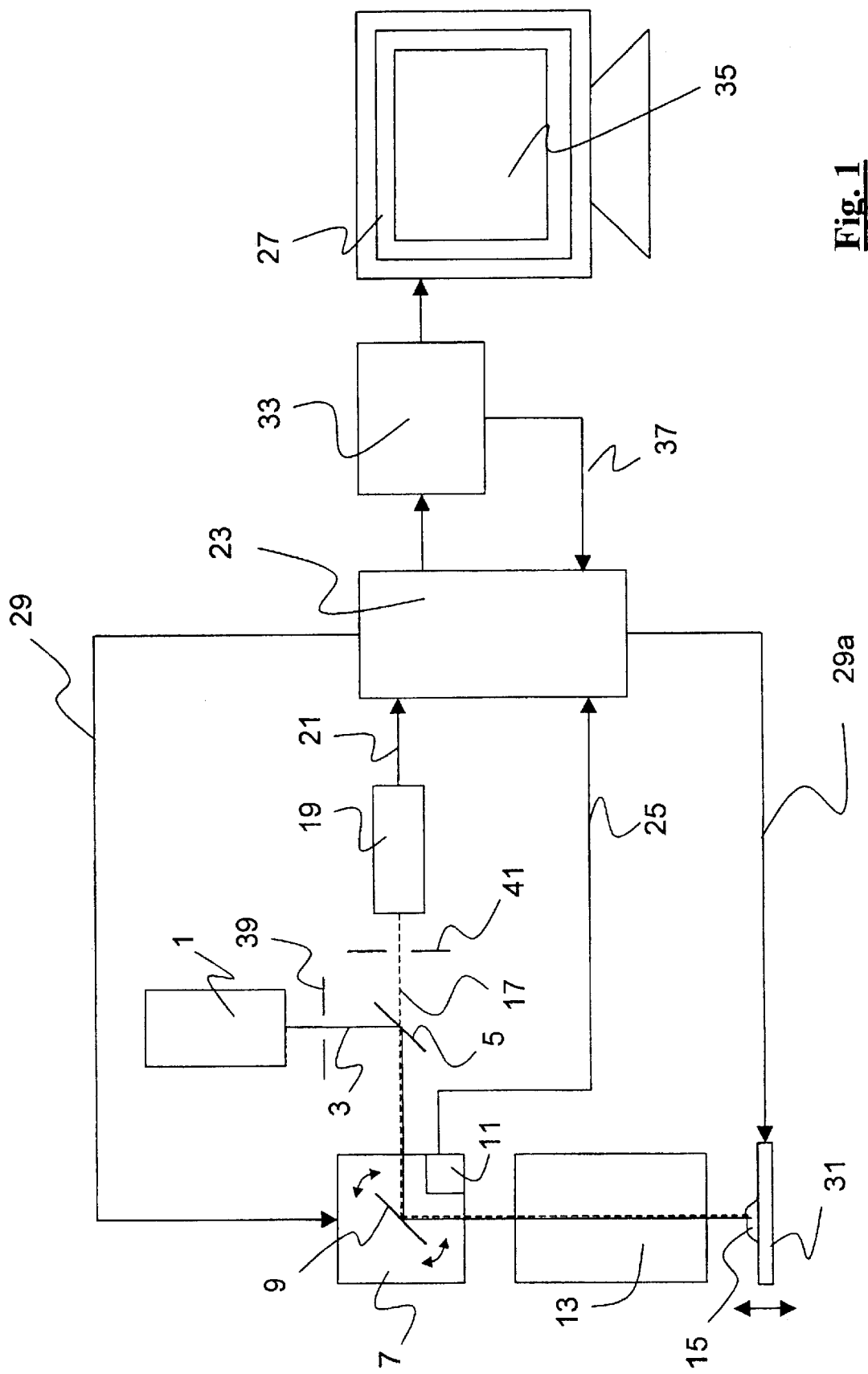
FIG. 1 shows the basic construction of a scanning microscope according to the invention.

FIG. 1 diagrammatically shows a confocal scanning microscope according to the invention. A light beam 3 coming from an illumination system 1 is reflected from a beam splitter 5 to the beam deflection device 7, which is controlled by the control and processing unit 23 via a line 29 and which comprises a cardanically suspended scanning mirror 9, which guides the beam through a microscope optic 13 over and into the inside of the specimen 15. The light beam 3 is guided over the specimen surface in the case of non-transparent specimens 15. In the case of biological specimens 15 (preparations) or transparent specimens, the light beam 3 can also be guided through the surface of the specimen 15. As a result, it is possible for different focal planes of the specimen to be scanned successively by the light beam 3. The subsequent combination of the reflected or fluorescent light emitted by the specimen for each raster point then produces a three-dimensional image of the specimen. The light beam 3 coming from the illumination system 1 is represented as a solid line. The reflected or fluorescent light 17 proceeding from the specimen 15 travels through the microscope optic 13 and via the beam deflection device 7 to the beam splitter 5, passes through the latter and impinges on the detector 19, which is embodied as a photomultiplier. The light 17 proceeding from the specimen 15 is represented as a broken line in the figure. In the detector 19, electrical detection signals 21 are generated which are proportional to the power of the light 17 proceeding from the specimen, and are forwarded to the control and processing unit 23. The position signals 25, which are detected in the beam deflection device 7 with the aid of a position sensor 11 which operates inductively or capacitively, are likewise transferred to the control and processing unit 23. The incoming analog signals are firstly digitized in the control and processing unit 23. The position and detection signals are assigned to one another in the control and processing unit 23 and forwarded to the PC 33 (computer) and are combined to form an image 35 which is displayed on the display 27. The PC 33 reads the required correction values from a memory (not shown) and forwards the corresponding data via the line 37 to the control and processing unit 23. In the control and processing unit 23, the correction data are converted into control correction signals which are taken into account in the generation of the control signals for the beam deflection device 7 and the specimen stage 31. As an alternative, the correction values may also already be converted before they are forwarded to the control and processing unit 23, e.g. as early as in the PC 33. In this case, the control correction signals are then already communicated to the control and processing unit 23 by the PC 33. The corrected control signals are then communicated to the components to be controlled by the control and processing unit 23 via the lines 29 and 29a.

The illumination pinhole 39, usually provided in a confocal scanning microscope, and the detection pinhole 41 are depicted diagrammatically for the sake of completeness. By contrast, a number of optical elements for guiding and shaping the light beams have been omitted for the sake of improved clarity. They are sufficiently known to a skilled worker active in this field.

In order to determine the correction values which are stored in a memory, for example in a memory area of the PC 33 (computer), the scanning microscope measures a sample 15 whose reflection or fluorescence behavior is known for each raster point. This known reflection or fluorescence behavior can be stored for each raster point in a further memory area of the PC 33. As described above, a reference sample is measured, the light beam 3 being guided over the sample via the beam deflection device 7 with the aid of the control and processing unit 23. An image of the sample is obtained from the reflected or fluorescent light, which image is compared with the reference image stored in the PC 33. If a deviation results from this comparison, which is carried out e.g. with the aid of an image processing system, it is possible to calculate therefrom a correction value for each raster point, which can likewise be stored in a further memory area of the PC 33 for the microscope optic 13 used. If further optics are used in the microscope, they, too, can be measured analogously. This is the case in particular when the microscope allows the use of a so-called objective turret in which various objectives can be used on a holder which can rotate about a central axis. These can be respectively introduced into the beam path by rotating the objective holder. For each of the objectives used, it is thus possible to determine a correction value for each raster point, which can be stored in a memory of the PC 33. Since in scanning microscopes it is possible to automatically identify which objective is used in the turret, this identification can also be used to control the correct selection of the correction data corresponding to the selected objective.

Figure 2:
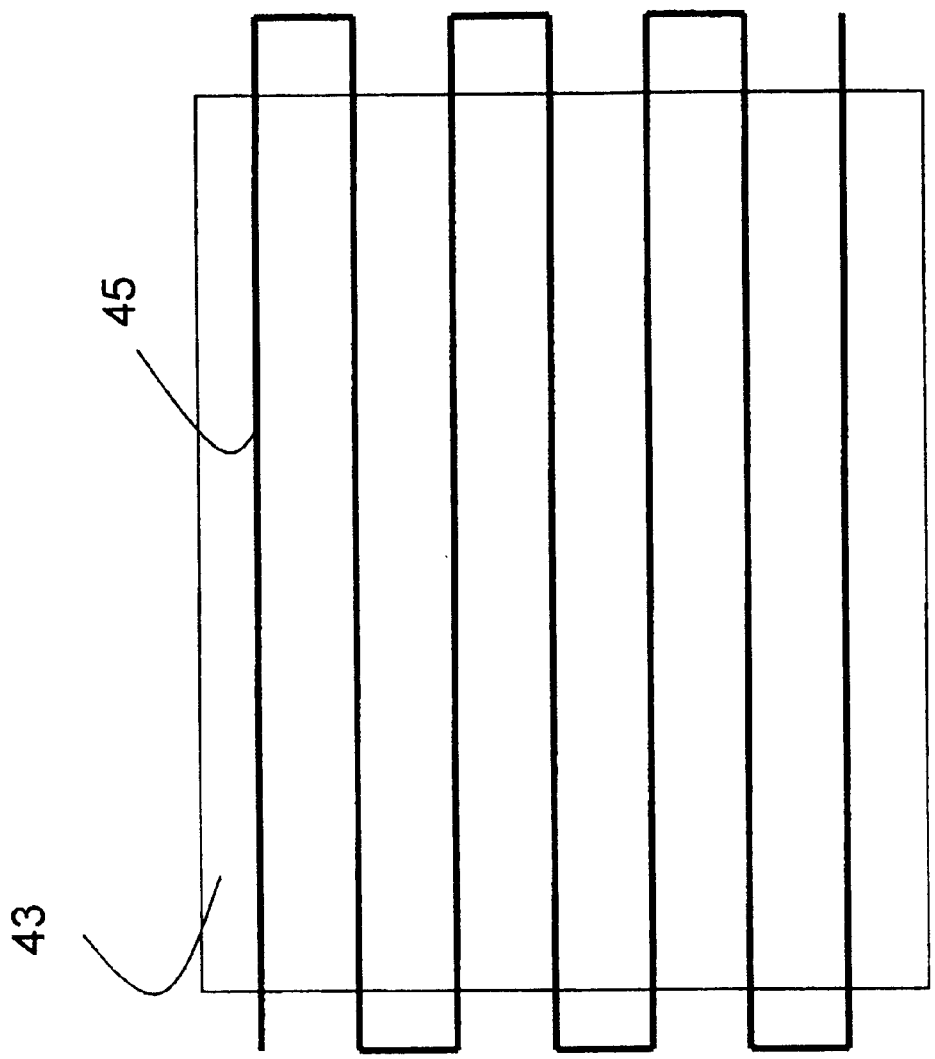
FIG. 2 shows a diagrammatic illustration of an ideal scanning path.

During the determination of the correction data, the light beam 3 is guided over a scanning field 43, as shown by FIG. 2. In this case, the scanning field 43 determines the area region which is swept over by the light beam 3 along the meander-shaped ideal scanning line 45. In this case, the scanning line corresponds to a so-called ideal scanning path which can be used for determining the correction values and essentially corresponds to the scanning line for optical systems without imaging defects. Owing to the inertia of the galvanometer mirrors, it is possible for this ideal scanning line 45 to correspond not to a meander but rather, in particular at high scanning speeds, to a sine curve. However, this is of secondary importance for the correction to be performed according to the invention, since, even in the case of a sinusoidal ideal scanning operation, the correction can be performed in accordance with the correction values determined.

Figure 3:
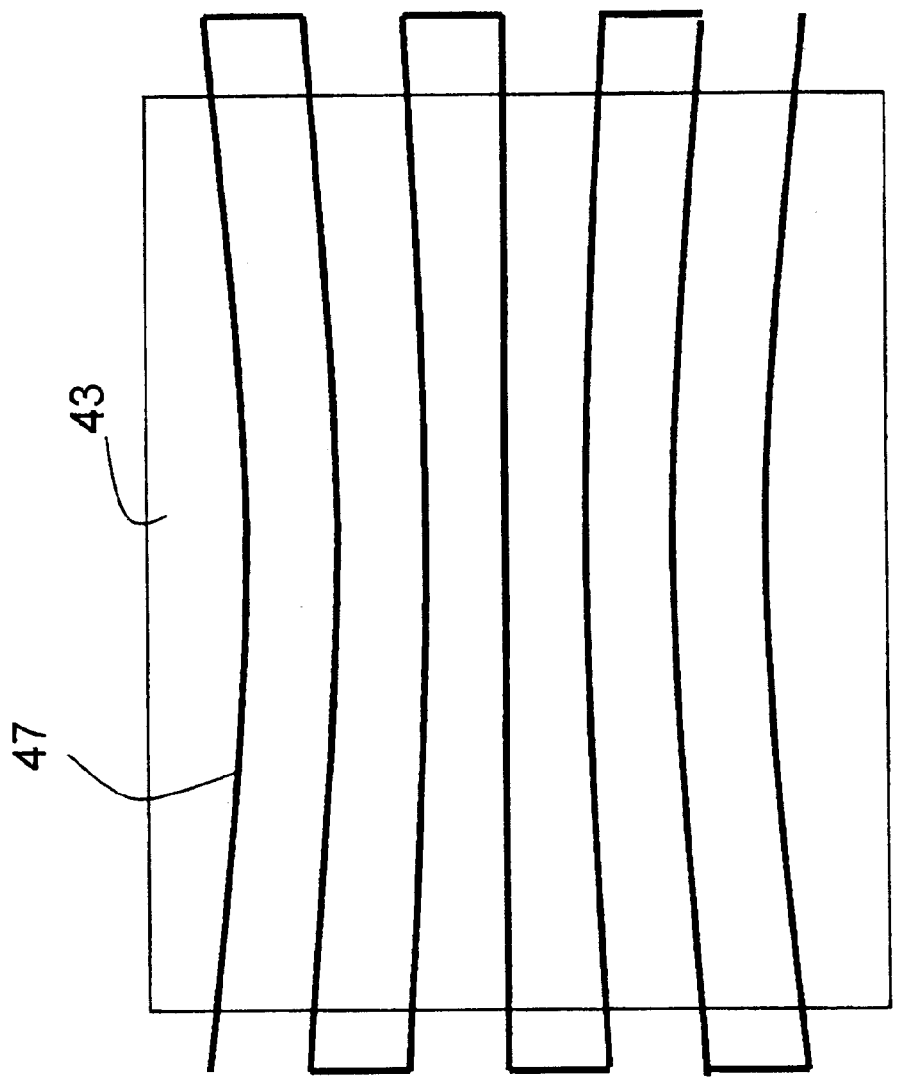
FIG. 3 shows a diagrammatic illustration of a corrected scanning path.

After the measurement of the microscope optic 13 used or of the optics used, the correction values that are to be used for each microscope optic 13 are stored in memory areas and can be used to correct the ideal scanning path 45, depending on the selected microscope optic 13, in order to compensate for the optical defects of the microscope optic 13. If a meander-shaped scanning path is chosen as the ideal scanning path, then FIG. 3 represents a corrected scanning path 47 for the case of an optical defect of the microscope optic 13 which results in a pincushion distortion. This corrected scanning path 47 is achieved by the correction values which are stored for the microscope optic 13 being fed to the control and processing unit 23 via the line 37, for example, and being converted into a control correction signal there. The control correction signal is applied to the actual control signal in the control and processing unit 23, with the result that a corrected control signal is generated. This corrected control signal can then be used to control the beam deflection device 7 or the cardanically suspended scanning mirrors 9 in such a way that the light beam 3 sweeps over the scanning field 43 in the corrected scanning path 47 and thus corrects the optical defect of the microscope optic 13 while the sample 15 is actually being scanned.

It goes without saying that the corrected signal can also be used to adjust the motor-adjustable specimen stage 31 via the line 29a in such a way that the correction values determined can be taken into account while the specimen 15 is actually being scanned. In addition, it is also possible to use the correction values determined for influencing the scanning speed, which is likewise prescribed by the control and processing unit 23, in order to compensate for existing defects of the microscope optic 13.

The invention has been described with regard to a particular embodiment. It goes without saying, however, that changes and modifications can be carried out without departing from the scope of protection of the claims below.

What is claimed is:

1. A method for compensating for imaging defects in scanning microscopy comprising the steps of:

scanning a specimen by a light beam at raster points, which define a scanning line, whereby the light beam is guided by a scanning device through a microscope optic, determining an imaging defect of the microscope optic, determining a correction value for at least one raster point from the imaging defect, calculating a corrected scanning line with respect to the correction value, scanning the specimen at raster points defined by the corrected scanning line.

2. The method as defined in claim 1, wherein the Scanning device is a beam deflection device, which is driven by control signals, and wherein the correction value is converted into a control correction signal for correcting the control signals.

3. The method as defined in claim 1, wherein the Scanning device is a stage for supporting the specimen, which is driven by stage control signals, whereby the correction value is converted into a stage control correction signal for correcting the stage control signals.

4. The method as defined in claim 1, wherein the correction value is used for influencing a scanning speed.

5. The method as defined in claim 1, wherein the imaging defect of the microscope optic is determined by a reference measurement.

6. The method as defined in claim 1, wherein the correction value is determined in one step for all the raster points.

7. The method as defined in claim 1, wherein the correction value is determined iteratively for all the raster points.

8. A scanning microscope comprising:
- a light source for emitting a light beam,
- a microscope optic for focusing the light beam onto a specimen,
- a scanning device for scanning the specimen by the light beam at raster points, which define a scanning line,
- means for determining an imaging defect of the microscope optic,
- means for determining correction values for at least one raster point,
- means for calculating a corrected scanning line from the correction values.

9. The scanning microscope as defined in claim 8, wherein the Scanning device is a beam deflection device, which is driven by control signals.

10. The scanning microscope as defined in claim 8, wherein the Scanning device is a stage for supporting the specimen, which is driven by stage control signals.

11. The scanning microscope as defined in claim 8, wherein the means for determining the imaging defect of the microscope optic comprise a computer with an image processing system.

12. The scanning microscope as defined in claim 8, further comprising:
- a memory for storing the correction values of the microscope optic.

13. The scanning microscope as defined in claim 8, wherein the scanning microscope is a confocal scanning microscope.

* * * * *